United States Patent
Ichikawa (10) Patent No.: US 11,704,815 B2
(45) Date of Patent: Jul. 18, 2023

(54) TRACKING DEVICE, TRACKING METHOD, AND TRACKING SYSTEM

(71) Applicant: TOSHIBA TEC KABUSHIKI KAISHA, Tokyo (JP)

(72) Inventor: Takashi Ichikawa, Tagata Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 36 days.

(21) Appl. No.: 17/537,353

(22) Filed: Nov. 29, 2021

(65) Prior Publication Data
US 2022/0084213 A1    Mar. 17, 2022

Related U.S. Application Data

(63) Continuation of application No. 16/813,666, filed on Mar. 9, 2020, now abandoned.

(30) Foreign Application Priority Data

May 9, 2019    (JP) .................................. 2019-089091

(51) Int. Cl.
   *G06T 7/70*      (2017.01)
   *G06T 7/20*      (2017.01)
   *G06T 7/50*      (2017.01)

(52) U.S. Cl.
   CPC .................. *G06T 7/20* (2013.01); *G06T 7/50* (2017.01); *G06T 7/70* (2017.01); *G06T 2207/30196* (2013.01)

(58) Field of Classification Search
   CPC .... G06T 7/20; G06T 7/50; G06T 7/70; G06T 2207/30196
(Continued)

(56) References Cited

U.S. PATENT DOCUMENTS

2004/0189813 A1*   9/2004   Tanaka .................... G06F 16/58
                                                                                                              707/E17.026
2014/0064560 A1    3/2014   Gornick et al.
(Continued)

FOREIGN PATENT DOCUMENTS

JP        2005347905 A    12/2005

OTHER PUBLICATIONS

Extended European Search Report dated Sep. 29, 2020 in corresponding European Patent Application No. 20169187.0, 8 pages.

*Primary Examiner* — Jayanti K Patel
*Assistant Examiner* — Richard B Carter
(74) *Attorney, Agent, or Firm* — Kim & Stewart LLP (57) ABSTRACT

A tracking device for tracking a target object includes an interface connectable to a camera configured to acquire an image and determine a location of the object within the image and a distance therefrom, a memory that stores first coordinates that indicate a location of the camera with respect to a reference point in the facility, and a first direction towards which the camera faces, and a processor configured to calculate a second direction from the camera to the object based on the first direction and the location of the object, based on the second direction and the distance, calculate second coordinates indicating a location of the target object with respect to the location of the camera, based on the first and second coordinates, calculate third coordinates indicating a location of the target object with respect to the reference point, and store the calculated third coordinates in the memory.

20 Claims, 8 Drawing Sheets

(58) Field of Classification Search
USPC .................. 348/143; 382/103; 707/17.026
See application file for complete search history.

(56) References Cited

U.S. PATENT DOCUMENTS

| | | | |
|---|---|---|---|
| 2015/0010204 A1* | 1/2015 | Iwai ................. | G06V 20/52 |
| | | | 382/103 |
| 2016/0269685 A1* | 9/2016 | Jessop ................ | H04N 7/142 |
| 2017/0339348 A1* | 11/2017 | Shimizu ............. | H04N 13/25 |
| 2018/0341818 A1* | 11/2018 | Steffanson .......... | G06T 7/74 |
| 2019/0096082 A1* | 3/2019 | Di ..................... | G06T 7/246 |

* cited by examiner

TRACKING DEVICE, TRACKING METHOD, AND TRACKING SYSTEM

This application is a continuation of U.S. patent application Ser. No. 16/813,666, filed Mar. 9, 2020, which is based upon and claims the benefit of priority from Japanese Patent Application No. 2019-089091, filed on May 9, 2019, the entire contents of which are incorporated herein by reference.

FIELD

Embodiments relate to a tracking device, a tracking method, and a tracking system.

BACKGROUND

Techniques for tracking a person's location by monitoring changes in an area of an image obtained by a camera.

However, since the image obtained by the camera does not contain any distance information on the distance from the camera to the person, the person's movement cannot be tracked in detail.

Under such circumstances, it has been desired to be able to track the movement of an object such as a person with high accuracy.

DETAILED DESCRIPTION

In general, according to one embodiment, a tracking device for tracking a current location of a target object within a facility, includes an interface circuit connectable to a camera configured to acquire an image and determine a location of the target object within the acquired image and a distance between the target object and the camera, a memory that stores first coordinates that indicate a location where the camera is installed with respect to a reference point predetermined in the facility, and a first direction towards which the camera faces, and a processor configured to upon receipt of the location of the target object and the distance from the camera, calculate a second direction from the camera to the target object based on the stored first direction and the received location of the target object within the image, based on the calculated second direction and the received distance, calculate second coordinates indicating a location of the target object with respect to the location where the camera is installed, based on the stored first coordinates and the calculated second coordinates, calculate third coordinates indicating a location of the target object with respect to the reference point of the facility, and store, as the current location of the target object, the calculated third coordinates in the memory.

Hereinafter, an example of the embodiment will be described with reference to the drawings.

First Embodiment

Figure 1:
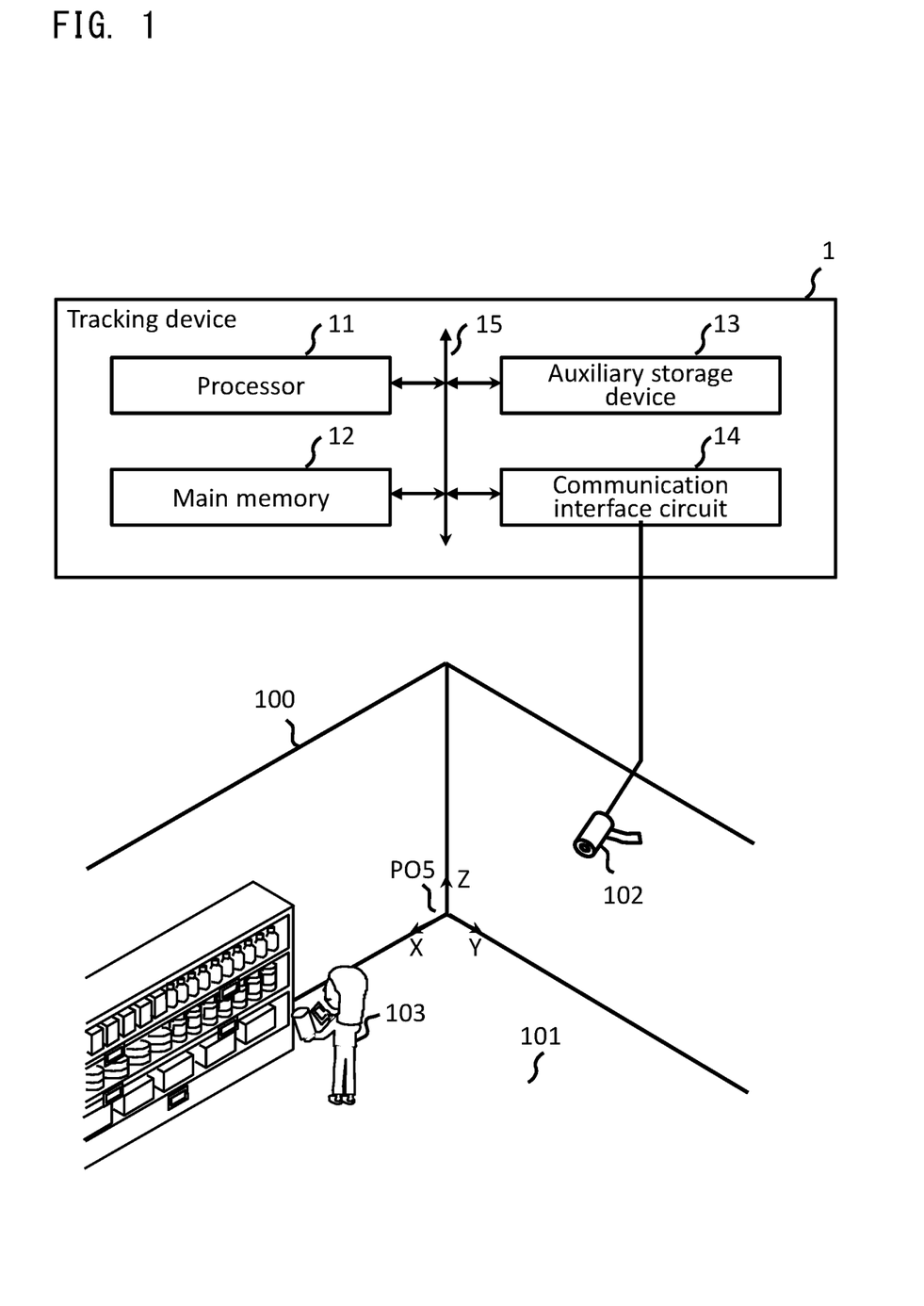
FIG. 1 is a block diagram illustrating a configuration of a tracking device according to a first embodiment.

FIG. 1 is a block diagram showing a configuration of a tracking device 1 according to a first embodiment. The tracking device 1 tracks movement of a person 103 in a sales room 101 of a store 100 by photographing the person 103 using an intelligent camera 102 installed on a wall of the sales room 101.

The intelligent camera 102 captures a moving image. The intelligent camera 102 determines a region (hereinafter referred to as a recognition area) in which the person 103 is shown in the captured moving image. The intelligent camera 102 measures a distance from the intelligent camera 102 to the person 103. The distance measurement method may be any method such as a stereo camera method or a ToF (time of flight) method. The intelligent camera 102 outputs detection data including a region data specifying the recognition area and a distance data representing the measured distance every time the new recognition area is determined.

The tracking device 1 includes a processor 11, a main memory 12, an auxiliary storage device 13, a communication interface 14, and a transmission line 15. The processor 11 corresponds to the central part of a computer. The processor 11 executes information processing for performing various functions of the tracking device 1 according to an information processing program such as an operating system, middleware and an application program.

The main memory 12 corresponds to a main memory section of the computer. The main memory 12 includes a nonvolatile memory region (e.g., ROM) and a volatile memory region (e.g., RAM). The main memory 12 stores the above-mentioned information processing program in the nonvolatile memory region. In addition, the main memory 12 may store data necessary for executing the information processing program in the nonvolatile or volatile memory region. The main memory 12 uses the volatile memory region as a work area in which data is appropriately rewritten by the processor 11.

The auxiliary storage device 13 may be, for example, an EEPROM (electric erasable programmable read-only memory), an HDD (hard disc drive), an SSD (solid state drive), or any other known storage device. The auxiliary storage device 13 stores data used for the processor 11 to perform various processes, and data generated by the processor 11. The auxiliary storage device 13 may store the information processing program described above.

The communication interface circuit 14 performs data communication with the intelligent camera 102 via a communication cable or a radio wave. As the communication interface 14, for example, a well-known communication device conforming to the USB (universal serial bus) standard, the LAN (local area network) standard, or the WLAN (wireless LAN) standard may be used. The transmission line 15 includes an address bus, a data bus, a control signal line, and the like, and transmits data and control signals to be exchanged between the connected components.

The tracking device 1 stores an information processing program in the main memory 12 or the auxiliary storage device 13, and an information processes to be mentioned below is performed by the processor 11. The information processing program may be stored in the main memory 12 or the auxiliary storage device 13 before shipment or transfer, or may be downloaded via a network after shipment or transfer. In the latter case, the information processing program may be recorded on a removable recording medium such as a magnetic disk, a magneto-optical disk, an optical disk, a semiconductor memory, or the like.

The operation of the tracking device 1 configured as described above will now be described. When the person 103 is in a state to be tracked, the processor 11 performs the information processing described below in accordance with the information processing program stored in the main memory 12 or the auxiliary storage device 13.

Figure 2:
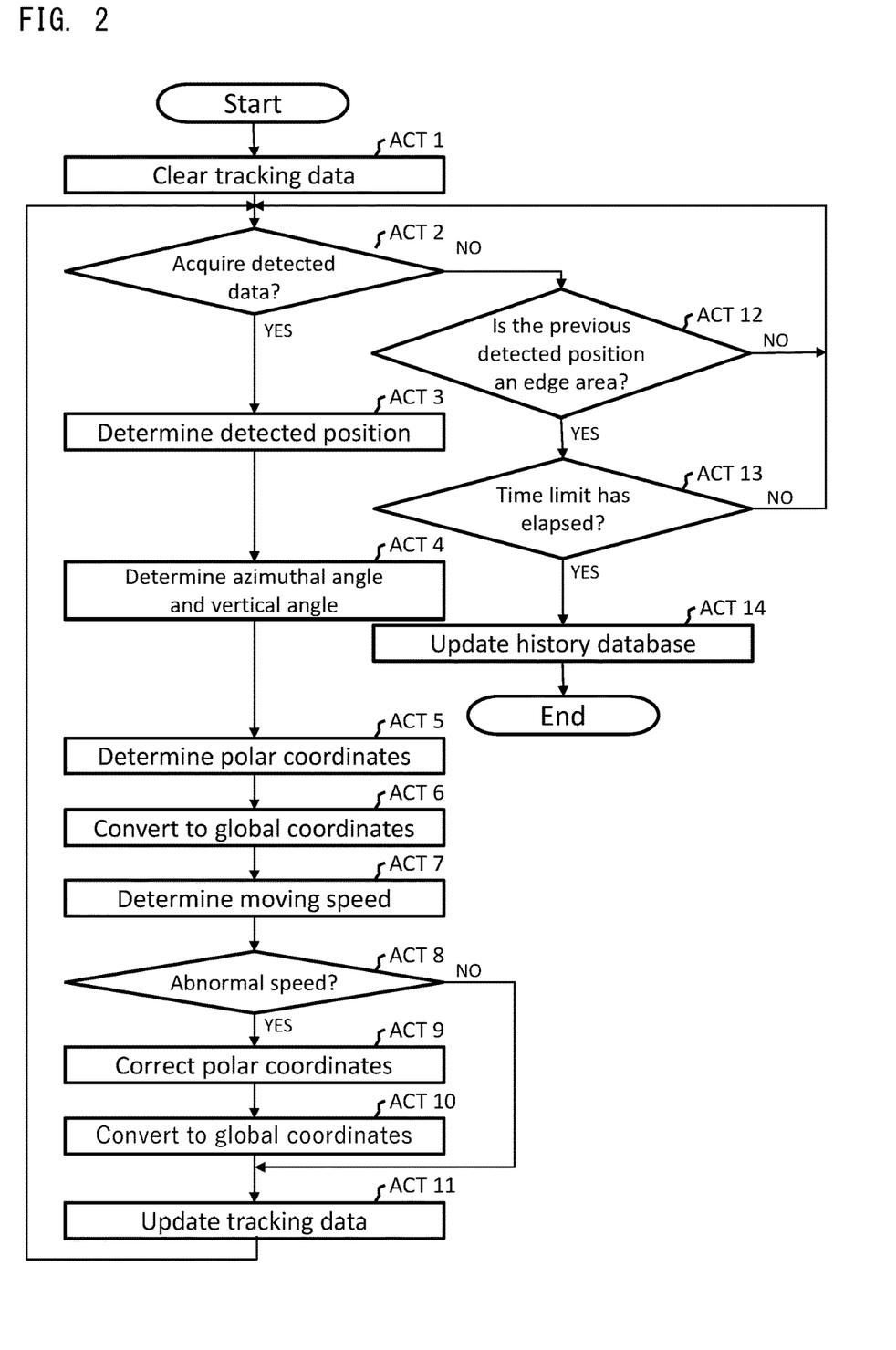
FIG. 2 is a flowchart of information processing performed by the tracking device.

FIG. 2 is a flowchart of the information processing performed by the processor 11. The contents of the processing described below are merely examples, and a change in the order of some processing, an omission of some processing, an addition of another processing, and the like are possible as appropriate. As ACT1, the processor 11 clears the tracking data stored in the main memory 12 or the auxiliary storage device 13. The tracking data will be described later.

Figure 3:
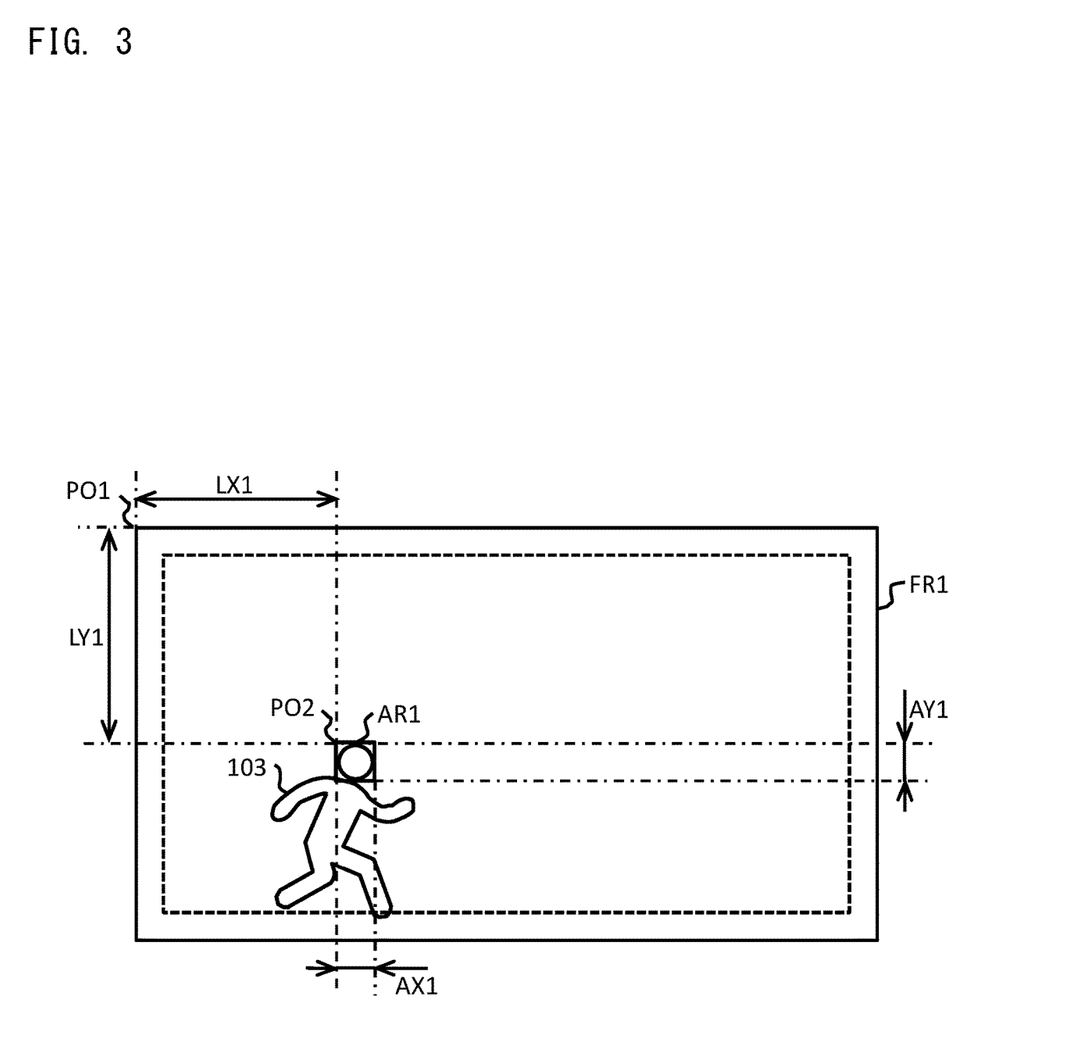
FIG. 3 is a diagram for explaining a determination made within a recognition area of a camera by the tracking device according to the first embodiment.

When the intelligent camera 102 is in an operation state for detecting a person, it always captures a moving image, and tries to determine a recognition area based on the moving image. FIG. 3 is a diagram for explaining a determination made within a recognition area of the intelligent camera 102. As an example, the intelligent camera 102 sets a rectangular area including an area recognized as the head of the person 103 in the frame FR1 of the moving image as the recognition area AR1. The intelligent camera 102 generates region data indicating (i) the X coordinate and the Y coordinate representing the position PO2 of the upper left corner of the recognition area AR1 in the 2D coordinate system in which the upper left corner of the frame FR1 is set as the origin PO1, and (ii) the number of dots of AR1 in the X direction AX1 (hereinafter referred to as the X size) and the number of dots of AR1 in the Y direction AY1 (hereinafter, referred to as the Y size). As an example, the intelligent camera 102 expresses the X coordinate and the Y coordinate as dots LX1 and LY1 in the leftward direction and the downward direction from the origin PO1. For example, the intelligent camera 102 generates time data indicating a time at which the recognition area is determined, and generate detection data including the region data and the time data.

When the person 103 to be tracked does not fall within the photographing range of the intelligent camera 102, the intelligent camera 102 does not output the detected data. When the head of the person 103 moving the sales room 101 enters within the photographing range of the intelligent camera 102 and is reflected in the captured moving image, the intelligent camera 102 outputs the detection data corresponding to the position in the moving image of the head of the person 103. The intelligent camera 102 then outputs the detection data corresponding to the position every time the head position changes, as long as the person 103 remains within the photographing range. That is, the output of the detected data by the intelligent camera 102 becomes irregular. Prior to outputting the detected data, the intelligent camera 102 requests the tracking device 1 to collect the detected data.

The processor 11 acquires, via the communication interface 14, the detected data in response to the request from the intelligent camera 102. In response to this instruction, the communication interface circuit 14 receives the detection data output from the intelligent camera 102, and the detected data is stored in the main memory 12 or the auxiliary storage device 13.

As ACT2 in FIG. 2, the processor 11 confirms whether or not the detected data has been acquired. If the detected data has been acquired (ACT2, YES), then the processor 11 proceeds to ACT3. In ACT3, the processor 11 determines the center of the region data included in the detected data, as the detected position of the person 103. For example, the processor 11 determines a position specified by CX1 and CY1 calculated by the following formula are set as the detection position of the person 103 shown in FIG. 3.

$CX1=(LX1+AX1/2)$ $CY1=(LY1+AY1/2)$

Figure 4:
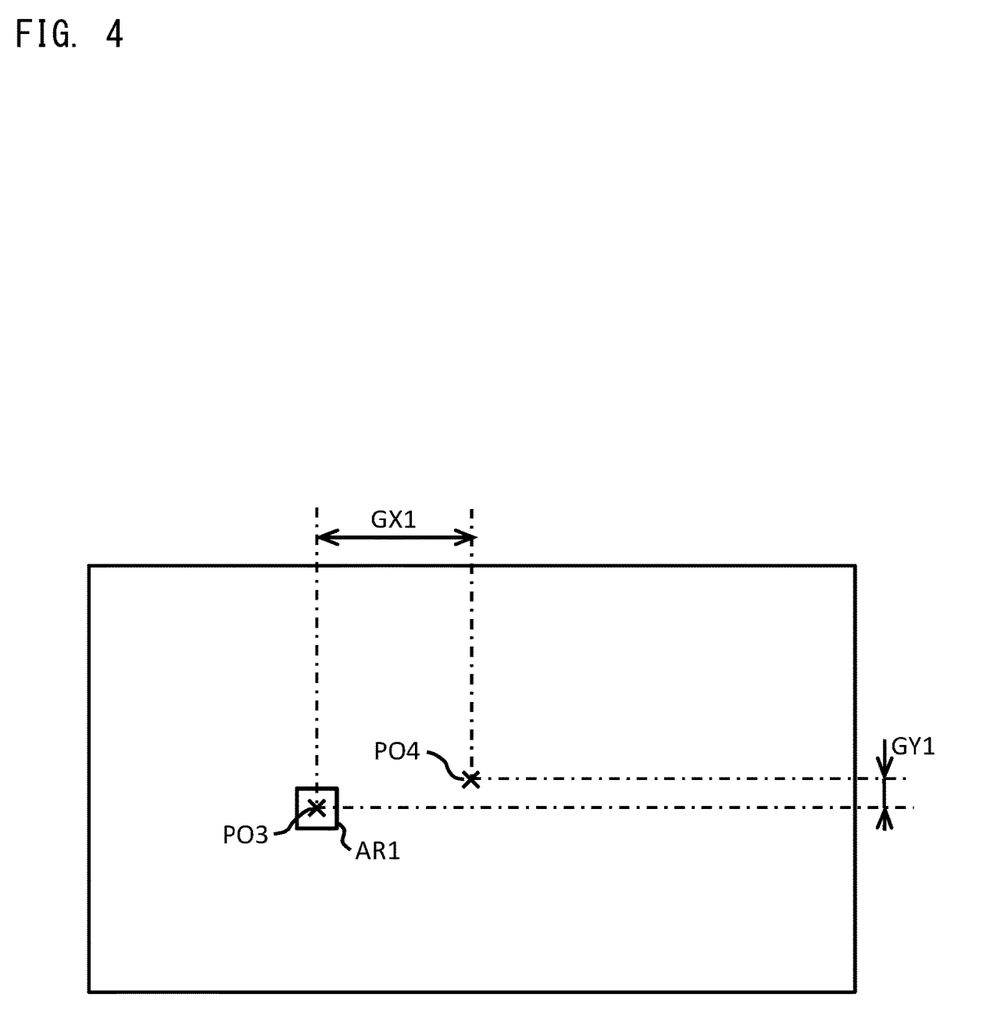
FIG. 4 is a diagram showing a detected position within the recognition area.

FIG. 4 is a diagram showing the detected position PO3 of the person 103 within the recognition area AR1 shown in FIG. 3. The detection position may be a position having a predetermined relationship with respect to the recognition area. For example, the position PO2 may be used as the detected position of the person 103 instead.

As ACT4 in FIG. 2, the processor 11 determines the azimuthal angle and the vertical angle formed between the photographing center direction of the intelligent camera 102 and the direction from the intelligent camera 102 to the detected position. The intelligent camera 102 includes an optical system having a large number of imaging elements arranged in two dimensions. The imaging elements located in the center of them receives light coming from the photographing center direction. In addition, the imaging elements positioned around the center-located imaging elements receives light coming from a direction different from the photographing center direction. As a result, the intelligent camera 102 captures an image with a certain angle of view. Therefore, as the distance from the center position PO4 of the frame FR1 to the detected position PO3 is larger, the angle formed between the photographing center direction and the direction to the detected position PO3 becomes larger. The relationship between the distance and the magnitude of the angle is determined by the optical characteristics of the intelligent camera 102.

Then, the processor 11 calculates a distance GX1 in the horizontal direction between the detection position PO3 and the center position PO4, and determines the angle corresponding to the distance GX1 as the azimuthal angle θH1. The processor 11 also calculates a distance GY1 in the vertical direction between the detection position PO3 and the center position PO4, and determines an angle corresponding to the distance GY1 as a vertical angle θV1. The processor 11 may determine the angle corresponding to the distance by a predetermined arithmetic operation in consideration of the characteristics of the optical system of the intelligent camera 102, or may refer to the table data representing the angle in association with the distance. In the optical system, it is desirable that the distance and the angle are related to each other so as to reduce the influence of the distortion characteristic. Here, the center position PO4 coincides with the photographing center direction of the intelligent camera 102. That is, the azimuthal angle θH1 and the vertical angle θV1 indicate the deviation amount between the direction from the intelligent camera to the detected position and the photographing center direction.

The azimuthal angle θH1 and the vertical angle θV1 are both based on the direction of the photographing center of the intelligent camera 102. The photographing center direction of the intelligent camera 102 often has an inclination with respect to the global coordinates. The global coordinates are coordinates within a predetermined 3D coordinate system in order to specify a position within the floor 101. The global coordinates are represented by X coordinate, Y coordinate and Z coordinate based on the reference position PO5 defined at the end of the floor as shown in FIG. 1, for example. The global coordinate system may be a logical coordinate system, and may be defined in any way.

As ACT5, the processor 11 determines polar coordinates in the global coordinate system for the detection position PO3. For example, the processor 11 adds the inclination of the global coordinates in the photographing center direction of the intelligent camera 102 to the X direction to the azimuthal angle θH1, thereby calculating the azimuthal angle θH2 in the global coordinate system for the detection position PO3. Further, the processor 11 calculates the vertical angle θV2 in the global coordinate system for the detection position PO3 by adding the inclination of the global coordinates in the photographing center direction of the intelligent camera 102 to the Z direction to the vertical angle θV1, for example. Then, the processor 11 determines the polar coordinates of the detection position PO3 (DI1, θV2, θH2) based on the azimuthal angle θH2, the vertical angle θV2 and distance DI3 indicated by distance data included in the detection data.

As ACT6, the processor 11 converts the polar coordinates (DI1, θV2, θH2) into global coordinates. The processor 11 calculates, for example, the following three equations to obtain the global coordinates (X1, Y1, Z1) where the global coordinates of the known intelligent camera 102 are represented by (X2, Y2, Z2).

$$X1 = DI1 * \sin\theta V2 * \cos\theta H2 + X2$$

$$Y1 = DI1 * \sin\theta V2 * \sin\theta H2 + Y2$$

$$Z1 = DI1 * \cos\theta V2 + Z2$$

As ACT7, the processor 11 determines the moving speed of the person 103. For example, when the ACT7 is executed from the start of the information processing shown in FIG. 2 for the first time, the processor 11 sets the moving speed to 0. For example, when the ACT3 is repeated as described later, the processor 11 determines, as the moving speed, a value obtained by dividing the distance between the global coordinates determined by the execution of the previous ACT6 and the global coordinates determined by the execution of the current ACT6 by the time difference between the time indicated by the time data included in the previous detection data and the time indicated by the time data included in the detected data. In other words, in this case, the processor 11 calculates the following equation:

$$\sqrt{\{(X1c-X1p)^2 + (Y1c-Y1p)^2 + (Z1c-Z1p)^2\}}/\Delta T$$

where the global coordinates determined by the execution of the previous ACT6 is expressed by (X1$p$, Y1$p$, Z1$p$), the global coordinates determined by the execution of the current ACT6 is expressed by (X1$c$, Y1$c$, Z1$c$), and the time difference is expressed by $\Delta T$.

That is, the moving speed determined in this example is the average moving speed when the person 103 moves between two detection positions determined in the two times consecutive position determinations.

As ACT7, the processor 11 confirms whether or not the detection data is abnormal. If the moving speed of the person 103 determined from the detection data is extremely fast, the processor 11 determines that the detection data is abnormal. For example, the processor 11 confirms whether or not the moving speed determined in ACT7 is equal to or greater than a predetermined threshold value. If it is equal to or greater than the threshold value, it is determined that there is an abnormality, and the process proceeds to ACT9.

As ACT9, the processor 11 corrects the polar coordinates. For example, the processor 11 replaces the distance DI1 with the value indicated by distance data included in the previous detection data. At this time, the processor 11 does not correct the vertical angle θV2 and the azimuthal angle θH2 of the polar coordinates (DI1, θV2, θH2) determined in ACT5. That is, instead of using the distance measured with respect to the current detection position PO3, the distance measured last time is used instead. Then, the vertical angle θV2 and the azimuthal angle θH2 determined with respect to the current detection position PO3 are used as they are. That is, because the vertical angle θV2 and the azimuthal angle θH2 are based on the position at which the person is actually reflected in the moving image, their accuracy is high. In contrast, the distance measurement by the stereo camera method and the ToF method may not be accurate depending on the environmental condition. For this reason, a major cause of an abnormal moving speed is an erroneous distance measurement, so the accuracy of tracking may be improved by not using such an incorrect distance.

In this way, it is determined that there is an abnormality in the ACT9 in the event that there is an abnormality in the distance data.

As ACT10, the processor 11 converts the polar coordinates corrected in ACT9 to global coordinates in the same manner as ACT6. Thereafter, the processor 11 proceeds to ACT11. When the moving speed is less than the threshold, the processor 11 determines NO in ACT8 as not abnormal, passes ACT9 and ACT10, and proceeds to ACT11. As ACT11, the processor 11 updates the tracking data. For example, when the ACT 10 is executed, the processor 11 updates the tracking data so as to include the global coordinates obtained in ACT together with the time data included in the current detection data. When the processor 11 passes ACT 10, it updates the tracking data so as to include the global coordinates obtained in ACT6 together with the time data included in the current detection data.

Then, the processor 11 then returns to ACT2. Thus, in the case where the head of the person 103 continues to exist within the photographing range of the intelligent camera 102 and the detection data is repeatedly output from the intelligent camera 102, the processor 11 repeatedly executes ACT3 to ACT11. That is, the processor 11 adds the global coordinates obtained based on the detection data to be repeatedly outputted to the tracking data in time series. Thus, the tracking data is obtained by tracking the position of the head of the person 103.

When the detection data is not captured, the processor 11 determines NO in ACT2, and proceeds to ACT12. As ACT12, the processor 11 confirms whether or not the detection position PO3 determined when the ACT3 has been executed last time is within an edge region, which is a predetermined region in the edge portion of the frame FR1 as shown in FIG. 3, i.e., between a rectangle drawn by dashed lines and the outer border of FR1. Then, the processor 11 determines NO in ACT12 when the previous detection position PO3 is not within the edge region, and returns to the ACT2 as it is. That is, as the ACT2 and ACT12, the processor 11 waits for the detection data to be fetched only if the previous detection position PO3 is inside or within the edge region, i.e., within the inner border of the edge region drawn by the dashed lines in FIG. 3 and within the edge region.

However, if the data is not detected and the previous detection position PO3 is within the edge region, the processor 11 determines YES in ACT12, and proceeds to ACT13. As ACT13, the processor 11 confirms whether or not a predetermined limit time has elapsed in a state in which the detection data is not captured. When the time limit has not elapsed, the processor 11 determines NO, and returns to ACT2 as it is. Thus, the processor 11 waits for the detection data to be captured or for the time limit to elapse, if the previous detection position PO3 was within the edge region. Then, when the predetermined limit time has elapsed while the detection data is not captured, the processor 11 determines NO in ACT13, and proceeds to ACT14.

As ACT14, the processor 11 updates a history database stored in the main memory 12 or the auxiliary storage device 13. The history database is a collection of the tracking data. The processor 11 updates the history database so as to include tracking data stored in the main memory 12 or the auxiliary storage device 13. The processor 11 also includes an identification code for identifying individual tracking data in the tracking data to be added to the history database. Then, the processor 11 ends the process shown in FIG. 2. Even when the processing shown in FIG. 2 is temporarily ended, the processor 11 starts the processing shown in FIG. 2 again if the person 103 is in a state to be tracked.

As described above, according to the tracking device 1, since the position of the person 103 is determined in consideration of the distance to the person 103 measured by the intelligent camera 102, the accuracy of determining the position is improved as compared to the case where only the moving image photographed by the camera is used. As a result, the movement of the person 103 can be tracked with high accuracy by the tracking device 1.

According to the tracking device 1, since the tracking data in which the determined positions are recorded in time series is generated, the movement trajectory of the person 103 can be easily recognized based on the tracking data.

According to the tracking device 1, since the history database storing the tracking data is generated, it is possible to easily recognize the entry and exit of the person 103 into and from the photographing region of the intelligent camera 102 and past movement trajectory of the person 103.

According to the tracking device 1, the position of the head of the person 103 is determined as coordinates in the 3D global coordinate system. Therefore, it is possible to recognize the behavior of the person 103 standing or crouching down to the floor on the basis of the Z coordinate. The result of the recognition is useful for specifying a commodity that the person 103 has taken out from the display shelf of the commodity.

In addition, according to the tracking device 1, when the abnormality of the detection data output from the intelligent camera 102 is suspected, the distance data of the detection data is not used for the position determination. Thus, even in a situation where a distance measured by the intelligent camera 102 is not accurate, it is possible to suppress a decrease in accuracy of the position determination.

According to the tracking device 1, even when the abnormality of the detection data output from the intelligent camera 102 is suspected, the region data of the detection data is used for the position determination. For this reason, in the direction from the intelligent camera 102 in which the person 103 is located, the latest detection result is reflected in the determination of the position, so that it is possible to suppress reduction in accuracy of the position determination in comparison with the case where all of the detection data is not used.

According to the tracking device 1, it is determined whether or not the detection data output from the intelligent camera 102 is abnormal based on the average moving speed between the two detected positions determined by the two times consecutive position determinations. For this reason, even when the determined distance becomes large due to absence of detection because of an intervening obstacle between the person and the intelligent camera 102, the new detection data is not erroneously determined to be abnormal.

Second Embodiment

Figure 5:
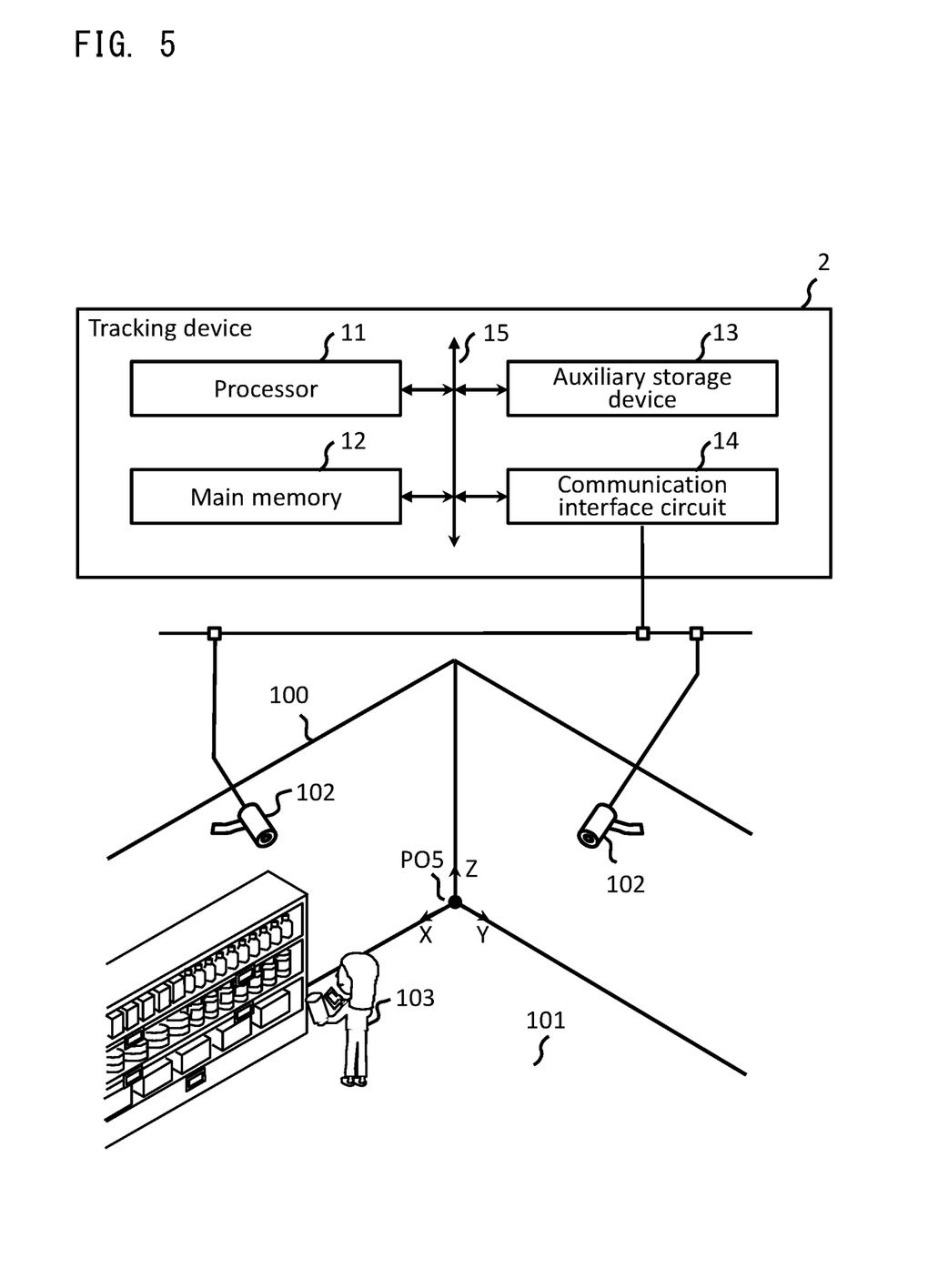
FIG. 5 is a block diagram illustrating a configuration of a tracking device according to a second embodiment.

FIG. 5 is a block diagram showing a configuration of a tracking device 2 according to a second embodiment. In FIG. 5, the same elements as those shown in FIG. 1 are denoted by the same reference numerals, and a detailed description thereof will not be repeated. The tracking device 2 tracks movement of the person 103 in the sales room 101 by photographing the person 103 using the two intelligent cameras 102 installed on the wall of the sales room 101 of the store 100. The two intelligent cameras 102 are provided so that the photographing center directions are different from each other and one person 103 can be photographed at the same time.

Figure 6:
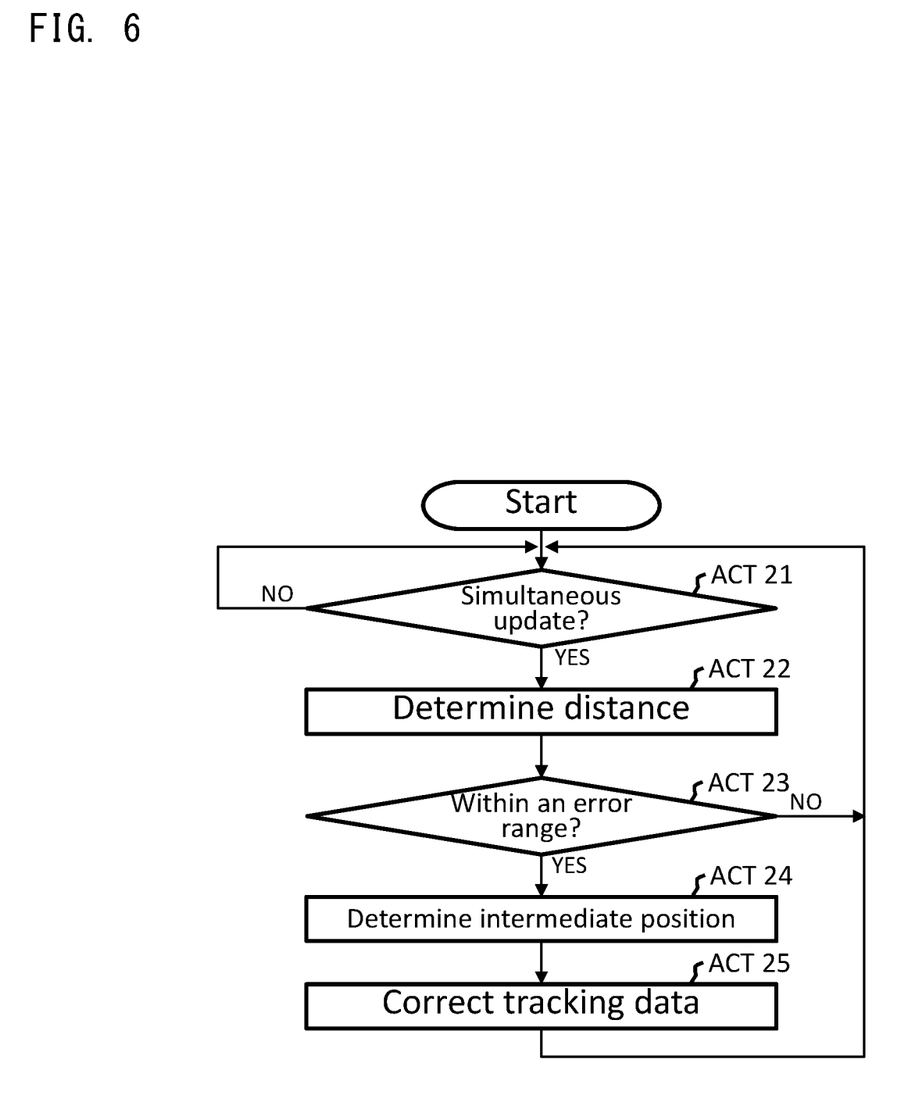
FIG. 6 is a flowchart of a correction process performed by the tracking device according to the second embodiment.

The tracking device 2 is similar to the tracking device 1 in the hardware configuration. The tracking device 2 is different from the tracking device 1 in respect of an information processing program related to information processing to be described later, and the information processing program is stored in the main memory 12 or the auxiliary storage device 13. That is, the tracking device 2 is different from the tracking device 1 in the information processing for tracking the person 103. The processor 11 executes the aforementioned information processing shown in FIG. 2 individually in parallel with respect to each of the two intelligent cameras 102. In the following, the information processing is referred to as a first tracking processing and a second tracking processing. The processor 11 executes information processing (hereinafter referred to as "correction processing") described below in parallel with the first and second tracking processing. FIG. 6 is a flowchart of a correction process performed by the processor 11 according to the second embodiment.

As ACT21, the processor 11 waits for the tracking data to be updated at the same time in the first and the second tracking processing. For example, when the tracking data corresponding to the first tracking processing (hereinafter referred to as first tracking data) and the tracking data corresponding to the second tracking processing (hereinafter referred to as second tracking data) are both updated and the added time data are the same as each other, the processor 11 determines YES as a simultaneous update, and proceeds to ACT22.

As ACT22, the processor 11 determines the distance between the global coordinates newly added to the first and second tracking data, respectively. For example, when the global coordinates (hereinafter referred to as first global coordinates and second global coordinates) added to the first and second tracking data are represented by (X1A, Y1A, Z1A) and (X1B, Y1B, Z1B), the processor 1 calculates the following equation.

$$\sqrt{\{(X1A-X1B)^2+(Y1A-Y1B)^2+(Z1A-Z1B)^2\}}$$

When the two intelligent cameras 102 are in a state in which the person 103 is photographed, the first and second tracking data may be updated at the same time. The first and second global coordinates to be added at this time are the determination results for the same position. However, the first and second global coordinates may not coincide with each other due to the detection accuracy of the two intelligent cameras 102 and the error generated in the processing for determining the first and second global coordinates.

Figure 7:
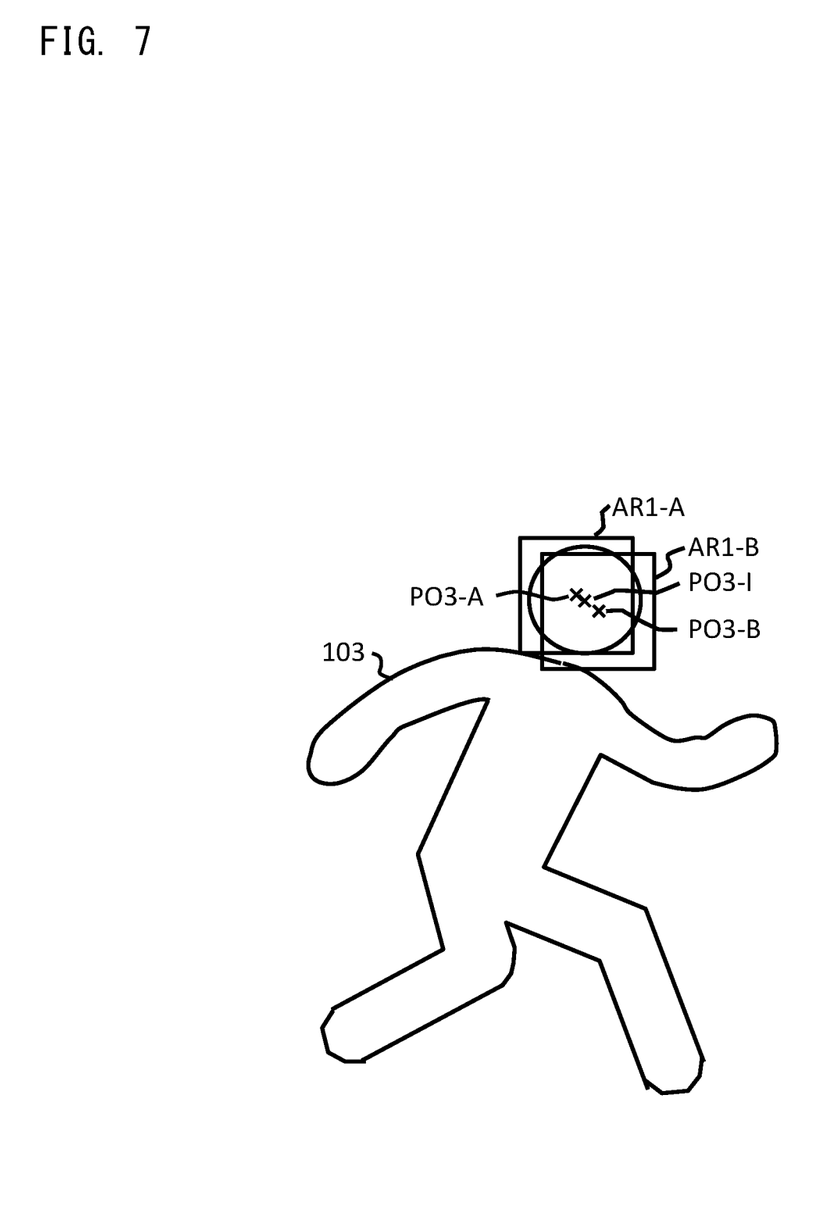
FIG. 7 is a diagram showing a situation in which positions of a person, detected by two intelligent cameras are not coincident with each other.

FIG. 7 is a diagram showing an example of a state in which the detection positions determined by the two intelligent cameras 102 are not coincident with respect to the one person 103. Although the two intelligent cameras 102 photograph the person 103 from different direction each other, FIG. 7 shows a state in which a deviation occurs in the detection position when the person 103 is photographed under the same condition for convenience. The detection positions PO3-A and PO3-B in FIG. 3 are shifted from the ideal detection position PO3-I.

Figure 8:
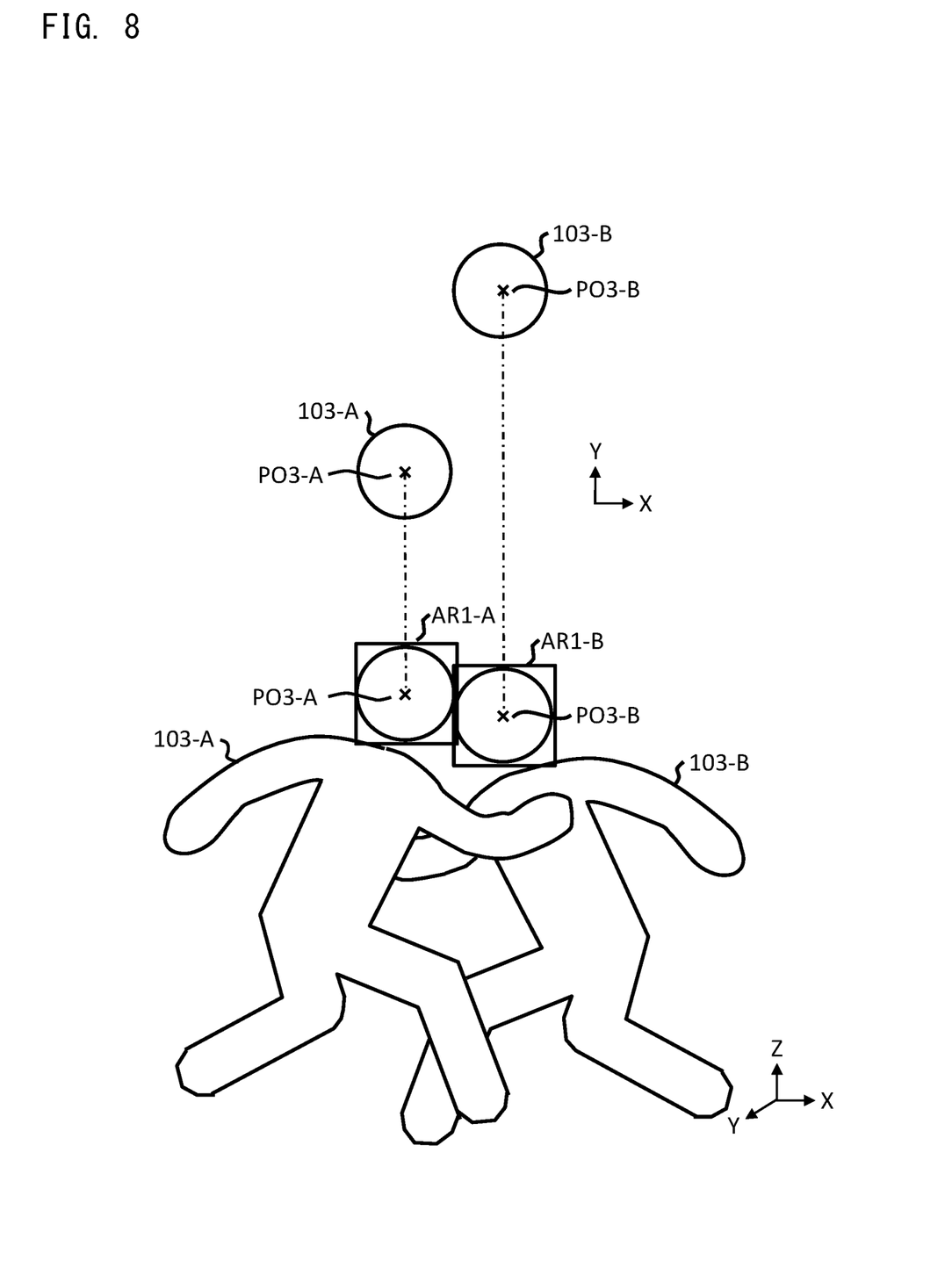
FIG. 8 is a diagram showing a difference in positions of two persons passing each other, detected by the two intelligent cameras.

In addition, when two intelligent cameras 102 individually detect two persons 103, the first and second global coordinates do not coincide with each other. FIG. 8 is a diagram showing an example of a difference in detection positions determined by the two intelligent cameras 102 with respect to two persons 103-A and 103-B which are different from each other. Note that although the two intelligent cameras 102 photograph persons 103-A and 103-B in different directions, FIG. 8 shows the difference between the detection positions PO3-A and PO3-B in the case where the persons 103-A and 103-B are photographed from the intelligent camera 102 installed under the same conditions for convenience. As shown in FIG. 8, the individual two persons 103 are in a separate position, and the heads are usually sufficiently separated from each other, so that the detection positions PO3-A and PO3-B are greatly separated from each other.

The deviation between the detection positions PO3-A and PO3-B caused by the error is very small with respect to the difference between the detection positions PO3-A and PO3-B of the two different persons 103. As ACT23, the processor 11 checks whether or not the determined distance is within a predetermined error range. The error range may be appropriately determined in consideration of the performance of the intelligent camera 102 and the like. If it is determined that the error is within the error range, the processor 11 proceeds to ACT24.

As ACT24, the processor 11 determines an intermediate position between the first global coordinates and the second global coordinates. For example, if X1A is equal to or less than X1B, then the processor 1 sets X1S=X1A, X1L=X1B, and if X1B is less than X1A, X1S=X1B, X1L=X1A. For example, if Y1A is equal to or less than Y1B, the processor 11 sets Y1S=Y1A and Y1L=Y1B, and if Y1B is less than Y1A, Y1S=Y1B, Y1L=Y1A. For example, if Z1A is equal to or less than Z1B, the processor 11 sets Z1S=Z1A, Z1L=Z1B, and if Z1B is less than Z1A, it sets Z1S=Z1B, Z1L=Z1A. Then, the processor 11 calculates X1, Y1, and Z1, for example, according to the following equation.

$$X1=X1S+(X1L-X1S)/2$$

$$Y1=Y1S+(Y1L-Y1S)/2$$

$$Z1=Z1S+(Z1L-Z1S)/2$$

As ACT25, the processor 11 corrects the tracking data. For example, the processor 11 replaces the first and second tracking data with the global coordinates (X1, Y1, Z1) of the first and second global coordinates which are finally added to the first and second tracking data, respectively. After this, the processor 11 returns to the standby state of ACT21. Note that if the distance determined by ACT22 is outside the error range, the processor 11 determines NO in ACT23, and returns to the standby state of ACT21 without executing ACT24 and ACT25. That is, the processor 11 makes the global coordinates determined by the first tracking processing and the second tracking processing valid without correcting the global coordinates.

As described above, according to the tracking device 2 of the second embodiment, when the same person 103 is detected simultaneously by the two intelligent cameras 102, the global coordinates of the position of the person 103 are determined in consideration of the two global coordinates determined by the information processing of the first embodiment. Thus, it is possible to perform more accurate position determination.

This embodiment can be implemented in a variety of ways as follows. The position of the person 103 may be tracked as coordinates in a 2D global coordinate system set as a horizontal plane in the sales room 101. In this case as well, it is possible to improve the accuracy of the position detection in comparison with the case where the distance data is not used.

The processor 11 may simply output the global coordinates determined in ACT6 or ACT10 to the outside without performing ACT11 in FIG. 2. In this case, data management for tracking a person may be performed by another information processing device.

The processor 11 may output the tracking data to an external device in the ACT14 in FIG. 2. In this case, the storage management of the tracking data may be performed by another information processing device.

The abnormality of the detection data may be determined based on the moving distance per unit time. If the intelligent camera 102 outputs the detection data at a predetermined time interval, the processor 11 may determine the abnormality of the detection data based on the distance between the previous detection position PO3 and the current detection position PO3.

The abnormality of the detection data may be determined by comparing the distance between the two detection positions determined by two consecutive position determinations to a threshold value. However, in this case, it is preferable to apply a larger threshold value as the time difference between the two successive position determinations is larger.

The processor 11 may not use all of the detection data determined to be abnormal in the position determination. That is, when the processor 11 determines YES in ACT8 in FIG. 2, for example, the processor 11 may return to ACT2. In this case, however, the temporal resolution of the position determination is lower than that in the above embodiment.

The intelligent camera 102 may determine a recognition area as a region other than the head, such as the torso of the person 103, or a region including the whole body of the person 103.

The intelligent camera 102 may detect any object other than the person 103, such as a shopping cart, for example. In this case, the tracking device 1 is used as a device for tracking an object other than the person 103 detected by the intelligent camera 102.

The intelligent camera 102 may be incorporated in the tracking device 1.

The facility to which the movement of the person 103 is to be monitored is not limited to the store 100, and may be any building such as a museum or any facility such as a road and a park.

The processor 11 may acquire the detection data by reading from a storage medium for storing the detection data output from the intelligent camera 102. The detection data in this case may be read directly by the processor 11 or indirectly via another information processing device.

In the second embodiment, the processing shown in FIG. 6 may be integrated with the processing shown in FIG. 2. For example, the processor 11 determines whether or not other tracking data are updated simultaneously after ACT11. If the processor 11 has been updated simultaneously, the processor 1 executes ACT22 to ACT25 in FIG. 6. However, the processor 11 corrects only the global coordinates added to the tracking data immediately before the ACT11 in the same information processing. In this case, the processor 11 returns to ACT2 in FIG. 2 when the other tracking data has not been updated simultaneously, or when NO is determined in ACT23, or when the ACT25 has been completed.

In the second embodiment, the detection results of three or more intelligent cameras 102 may be processed by the tracking device 1. Then, the processor 11 determines the corrected global coordinates of the global coordinates as an intermediate position of the plurality of global coordinates that are within the tolerance range.

In the second embodiment, the plurality of information processing shown in FIG. 2 and the information processing shown in FIG. 6 may be distributed by a plurality of information processing devices. In this case, the tracking device is configured by a combination of the plurality of information processing devices.

Each function realized by the processor 11 by the information processing may be realized by hardware that executes information processing that is not based on a program such as a logic circuit or the like. Each of the functions described above may also be realized by combining software control with hardware such as the logic circuit described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. These embodiments and variations thereof are included in the scope and spirit of the invention and are included within the scope of the appended claims and their equivalents.

What is claimed is:

1. A tracking device for tracking a current location of a target object within a facility, comprising:
an interface circuit connectable to a camera configured to acquire an image and determine a location of the target object within the acquired image and a distance between the target object and the camera;
a memory that stores
first coordinates that indicate a location where the camera is installed with respect to a reference point predetermined in the facility, and
a first direction towards which the camera faces; and
a processor configured to
upon receipt of the location of the target object and the distance from the camera,
calculate a second direction from the camera to the target object based on the stored first direction and the received location of the target object within the image,
based on the calculated second direction and the received distance, calculate second coordinates indicating a location of the target object with respect to the location where the camera is installed,
based on the stored first coordinates and the calculated second coordinates, calculate third coordinates indicating a location of the target object with respect to the reference point of the facility,
store, as the current location of the target object, the calculated third coordinates in the memory,
calculate a moving velocity of the target object based on the calculated third coordinates and previous third coordinates indicating a previous location of the target object,
determine whether the calculated moving velocity is equal to or greater than a threshold, and
upon determining that the calculated moving velocity is equal to or greater than the threshold, correct the calculated third coordinates using:
the location that has been received from the camera and used for calculating the current location of the target object, and
a previous distance that has previously been received from the camera and used for calculating the previous location of the target object.

2. The tracking device according to claim 1, wherein the distance that has been received from the camera and used for calculating the current location of the target object is not used to correct the calculated third coordinates.

3. The tracking device according to claim 1, wherein the second coordinates are polar coordinates indicating the location of the target object with respect to the location where the camera is installed.

4. The tracking device according to claim 3, wherein the first coordinates are absolute coordinates indicating the location where the camera is installed with respect to the reference point of the facility, and
the third coordinates are absolute coordinates indicating the location of the target object with respect to the reference point.

5. The tracking device according to claim 1, wherein the processor is further configured to store time information indicating when the image of the target object is acquired by the camera, together with the calculated third coordinates in the memory.

6. The tracking device according to claim 1, wherein the target object is a person, and
the location of the target object determined by the camera is a location where a head of the person is located within the image.

7. The tracking device according to claim 6, wherein the facility is a sales room of a store.

8. The tracking device according to claim 7, wherein the processor is further configured to, based on the calculated third coordinates, determine a location of the target object with respect to a display shelf of a commodity sold in the store.

9. The tracking device according to claim 8, wherein the third coordinates are two dimensional coordinates on a plane corresponding to a floor of the store on which the display shelf is disposed.

10. The tracking device according to claim 1, wherein the processor is configured to repeat a process of the calculation of the second direction, the second coordinates, and the third coordinates, and the storage and correction thereof, as long as the target object is located within the image.

11. A method for tracking a current location of a target object within a facility, the method comprising:
  storing
    first coordinates that indicate a location where a camera is installed with respect to a reference point predetermined in the facility, and
    a first direction towards which the camera faces;
  acquiring an image by the camera and determining a location of the target object within the acquired image and a distance between the target object and the camera;
  calculating a second direction from the camera to the target object based on the stored first direction and the acquired location of the target object;
  based on the calculated second direction and the acquired distance, calculating second coordinates indicating a location of the target object with respect to the location where the camera is installed;
  based on the stored first coordinates and the calculated second coordinates, calculating third coordinates indicating a location of the target object with respect to the reference point of the facility;
  based on the calculated third coordinates, determining a location of the target object with respect to a display shelf of a commodity within the facility;
  storing, as the current location of the target object, the calculated third coordinates;
  calculating a moving velocity of the target object based on the calculated third coordinates and previous third coordinates indicating a previous location of the target object;
  determining whether the calculated moving velocity is equal to or greater than a threshold; and
  upon determining that the calculated moving velocity is equal to or greater than the threshold, correcting the calculated third coordinates using:
    the location that has been received from the camera and used for calculating the current location of the target object, and
    a previous distance that has previously been received from the camera and used for calculating the previous location of the target object.

12. The method according to claim 11, wherein the distance that has been received from the camera and used for calculating the current location of the target object is not used to correct the calculated third coordinates.

13. The method according to claim 11, wherein the second coordinates are polar coordinates indicating the location of the target object with respect to the location where the camera is installed.

14. The method according to claim 13, wherein the first coordinates are absolute coordinates indicating the location where the camera is installed with respect to the reference point of the facility, and the third coordinates are absolute coordinates indicating the location of the target object with respect to the reference point.

15. The method according to claim 11, further comprising:
  storing time information indicating when the image of the target object is acquired by the camera, together with the calculated third coordinates.

16. The method according to claim 11, wherein the target object is a person, and the location of the target object determined by the camera is a location where a head of the person is located within the image.

17. The method according to claim 16, wherein the facility is a sales room of a store.

18. The method according to claim 17, further comprising:
  based on the calculated third coordinates, determining a location of the target object with respect to a display shelf of a commodity sold in the store.

19. The method according to claim 18, wherein the third coordinates are two dimensional coordinates on a plane corresponding to a floor of the store on which the display shelf is disposed.

20. A tracking system for tracking a current location of a target object within a facility, the tracking system comprising:
  a camera configured to acquire an image and determine a location of the target object within the acquired image and a distance between the target object and the camera; and
  a tracking device including
    a memory that stores
      first coordinates that indicate a location where the camera is installed with respect to a reference point predetermined in the facility, and
      a first direction towards which the camera faces, and
    a processor configured to
      upon receipt of the location of the target object and the distance from the camera,
      calculate a second direction from the camera to the target object based on the stored first direction and the received location of the target object,
      based on the calculated second direction and the received distance, calculate second coordinates indicating a location of the target object with respect to the location where the camera is installed,
      based on the stored first coordinates and the calculated second coordinates, calculate third coordinates indicating a location of the target object with respect to the reference point of the facility,
      store, as the current location of the target object, the calculated third coordinates in the memory,
      calculate a moving velocity of the target object based on the calculated third coordinates and previous third coordinates indicating a previous location of the target object,
      determine whether the calculated moving velocity is equal to or greater than a threshold, and
      upon determining that the calculated moving velocity is equal to or greater than the threshold, correct the calculated third coordinates using:
        the location that has been received from the camera and used for calculating the current location of the target object, and
        a previous distance that has been received from the camera and used for calculating the previous location of the target object.

* * * * *